United States Patent [19]

Schmidt

[11] Patent Number: 4,885,902
[45] Date of Patent: Dec. 12, 1989

[54] AQUATIC VEGETATION HARVESTER

[76] Inventor: Michael Schmidt, 51 Tamarack Rd., Mahopac, N.Y. 10541

[21] Appl. No.: 181,323

[22] Filed: Apr. 13, 1988

[51] Int. Cl.⁴ ............................................. A01D 45/08
[52] U.S. Cl. .......................................... 56/8; 56/10.3; 56/11.2; 56/257
[58] Field of Search .................. 56/8, 9, 10.3, 10.4, 56/11.2, 11.7, 17.2, 17.6, 236, 257, 242, 264, 266, DIG. 6; 74/798, 49, 198, 206, 216.3

[56] References Cited

U.S. PATENT DOCUMENTS

| | | | |
|---|---|---|---|
| 1,269,139 | 6/1918 | Welch | 56/8 |
| 1,387,578 | 8/1921 | Yost . | |
| 1,986,177 | 1/1935 | Zastoupil | 74/798 |
| 2,065,733 | 12/1936 | Pearson | 56/8 |
| 2,223,641 | 12/1940 | Sanger | 56/8 |
| 2,343,848 | 5/1944 | Rabl . | |
| 2,417,613 | 3/1947 | Radabaugh . | |
| 2,528,470 | 10/1950 | Elder | 74/798 |
| 2,536,803 | 1/1951 | Gleason | 74/798 |
| 2,540,616 | 2/1951 | Hasslacher | 56/10.3 |
| 2,692,508 | 10/1954 | Orr | 56/257 |
| 2,907,162 | 10/1959 | Rebikoff | 56/9 |
| 3,227,005 | 1/1966 | Johnson | 74/798 |
| 3,477,315 | 11/1969 | Macks . | |
| 3,499,271 | 3/1970 | Drigert | 56/8 |
| 3,520,117 | 7/1970 | Pepke et al. . | |
| 3,601,956 | 8/1971 | Akermanis . | |
| 3,631,742 | 1/1972 | Hoffmeister . | |
| 3,765,156 | 10/1973 | Porter | 56/8 |
| 3,808,779 | 5/1974 | Randall . | |
| 3,973,378 | 8/1976 | Bartasevich . | |
| 4,060,010 | 11/1977 | Heden . | |
| 4,202,155 | 5/1980 | Stewart | 56/9 |
| 4,617,838 | 10/1986 | Anderson | 74/798 |

FOREIGN PATENT DOCUMENTS

| | | |
|---|---|---|
| 1507342 | 12/1969 | Fed. Rep. of Germany . |
| 787268 | 9/1935 | France . |
| 1051916 | 1/1954 | France ..................................... 56/8 |
| 2222005 | 10/1974 | France . |
| 125643 | 5/1927 | Switzerland . |
| 126354 | 7/1928 | Switzerland . |
| 18665 | of 1913 | United Kingdom . |
| 880317 | 10/1961 | United Kingdom . |

OTHER PUBLICATIONS

Popular Science, p. 117, Apr. 1950.
Erectoweld Inc.–Aguamarine Sales Literature.

*Primary Examiner*—Bruce M. Kisliuk
*Attorney, Agent, or Firm*—Schweitzer & Cornman

[57] ABSTRACT

A submarine vegetation cutter is disclosed, driven by a direct current electrical motor adapted to drive two reciprocating type cutting blade assemblies which are disposed in a substantially opposed relationship relative to each other, and means for transmitting the driving force of the motor to the blade assemblies, and means for reversing the polarity of the direct current to the motor. There is also included a level switch for preventing electrical power from being conducted to the motor when the vegetation cutter is held at a more than predetermined angle from the vertical.

17 Claims, 7 Drawing Sheets

AQUATIC VEGETATION HARVESTER

FIELD OF THE INVENTION

The invention relates to a submarine vegetation cutter for the efficient removal of algae and the like growing from the bottom bodies of water, or for the harvesting of aquatic crops.

BACKGROUND OF THE INVENTION

The growth of most submarine vegetation, such as algae, is harmful to the ecology of a body of water. It substantially contributes to the eutrophication of the body of water and this eventually leads to the extinction of all life from the water and to the formation of a slimy overgrowth. This renders the water unsightly and useless for practically any purpose. Harvesting of submarine vegetation growth, along with the building of sewers to prevent nutrient run-off into the water, are among the principal measures to save bodies of water from eutrophication.

The harvesting of submarine vegetation is carried out practically exclusively with clumsy, inefficient machinery which is generally very large and provides its own flotation. The operator of the large machinery usually rides the machine itself in the water. Alternative means for the removal of submarine vegetation growth includes various toxic chemicals, but these are expensive and have their own dangerous ecological side effects. There is no simple, relatively small machinery available to small riparian owners for the removal of submarine vegetation growth.

There are various smaller submarine vegetation cutting devices disclosed in the prior art, however, none of them appear to have been commercially realized. U.S. Pat. No. 3,499,271 shows an underwater weed cutter attachment for the drive shaft of an outboard motor and the propeller of the motor is, in turn, attached to the drive shaft protruding from the cutter attachment. Two sets of flat reciprocating blades are powered from the drive shaft of the outboard motor through a power transmission.

U.S. Pat. No. 3,601,956 discloses a hand operated underwater cutter in which double edged blades are attached to opposite sides of a header which is mounted at the end of a shaft which permits the immersion of the header and the blades into the water. The blades pivot away from the direction of movement to permit uncut weeds from slipping out of the end of the blade to prevent it from fouling.

French patent No. 1,051,916; and Swiss patents Nos. 125,643 and 126,354 also describe simple, rudimentary underwater weed cutting devices or features thereof.

OBJECT AND BRIEF DESCRIPTION OF THE INVENTION

The object of the present invention is to provide a submarine vegetation cutter or harvester which is small, can be inexpensively produced, and can be easily used either from a boat, a pier, the shore, or by wading in the water. The device of the present invention can be attached to a support, such as the side or transom of a boat or a stationary support, such as a sawhorse. The submarine vegetation cutter, therefore, has to be of light weight and not bulky, it should adapt easily to frequent and rapid variations in depth and inclination of the bottom of the water, it should be able to cope with the sudden appearance of larger objects, such as rocks, cans and the like and it should remain free from entanglement and snagging when encountering objects which it cannot or should not cut, such as ropes, cables, underwater tree branches and the like.

The object of the invention is achieved by a submarine vegetation cutter in accordance with the present invention, which comprises a direct current electrical motor for generating a driving force, two reciprocating type cutting blade assemblies disposed in a substantially opposed relationship relative to each other, means for transmitting the driving force of said motor to said blade assemblies, and means for reversing the polarity of the direct current to said motor. In the submarine vegetation cutter of the present invention the means for transmitting is located in a plane that is disposed between the cutting blade assemblies, and each cutting blade assembly comprises a toothed, movable cutting blade for reciprocating cutting motion disposed in use parallel to and substantially below a toothed stationary cutting blade, whereby the actual cutting of a stem of submarine vegetation takes place largely when the stem is nipped between said movable cutting blade and said stationary cutting blade. The cutter of the present invention suitably also includes means for temporarily disengaging the transmission of driving force to said cutting blade assemblies when a greater than predetermined force resists reciprocation in the cutting blade assembly.

DESCRIPTION OF THE DRAWING

The aforementioned and additional features of the present invention are illustrated through a preferred embodiment of the invention described by reference being had to the drawing wherein.

DESCRIPTION OF PREFERRED EMBODIMENTS

Figure 1:
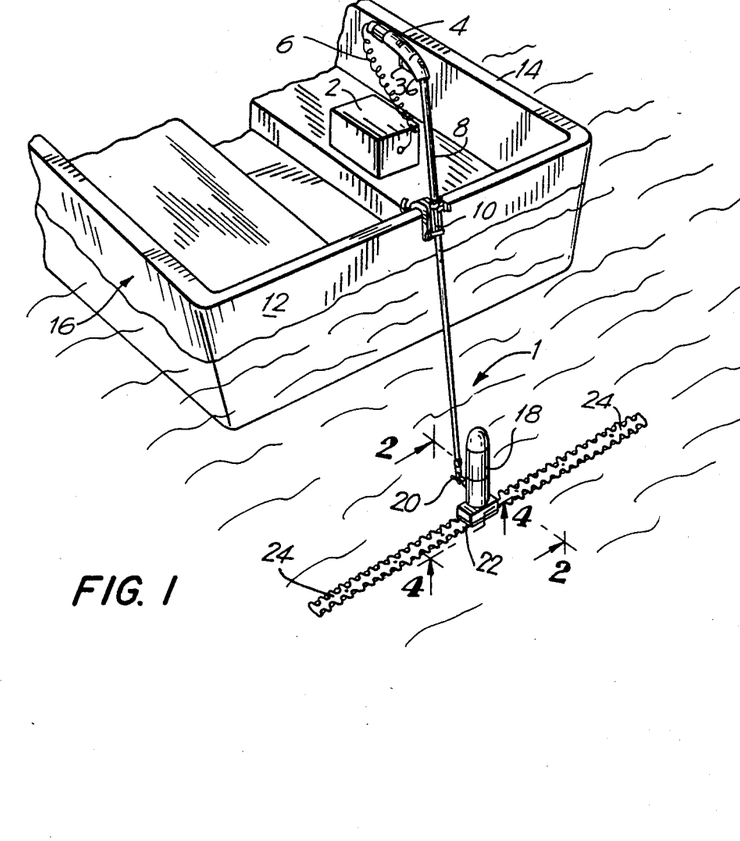
FIG. 1 is a perspective view of a preferred embodiment of the invention, when the cutter is mounted on the transom of a boat.

As shown in FIGS. 1-5, the submarine vegetation cutter embodiment 1 of the present invention is powered by an electrical storage battery 2. The nature of the battery is not significant; it can be of a one-time charge type or a rechargeable type, however the latter is generally more efficient. At one extremity of the vegetation cutter 1 is a handle 4 and the output of the battery 2 is wired into the handle through a coiled cord 6. The handle 4 is disposed at one end of a mounting rod 8 which in the embodiment shown in FIG. 1, is attached by a clamp assembly 10 to the transom 12 of a boat 14. The mounting rod 8 ranges below the water level 16 and a motor assembly 18 is attached to the other end of the mounting rod by an adjustable attachment 20. In FIG. 1 a transmission 22 is disposed under the motor assembly 18 and two reciprocating cutting assemblies 24 extend from the transmission in opposite direction relative to each other.

The handle 4 can suitably contain an otherwise conventional switch (not shown) for preventing electrical power from said storage battery 2 being conducted to the motor assembly 18, when a preselected operating condition, such as deviation from the vertical as is shown e.g. in FIG. 1, is exceeded by a predetermined angle.

Figure 2:
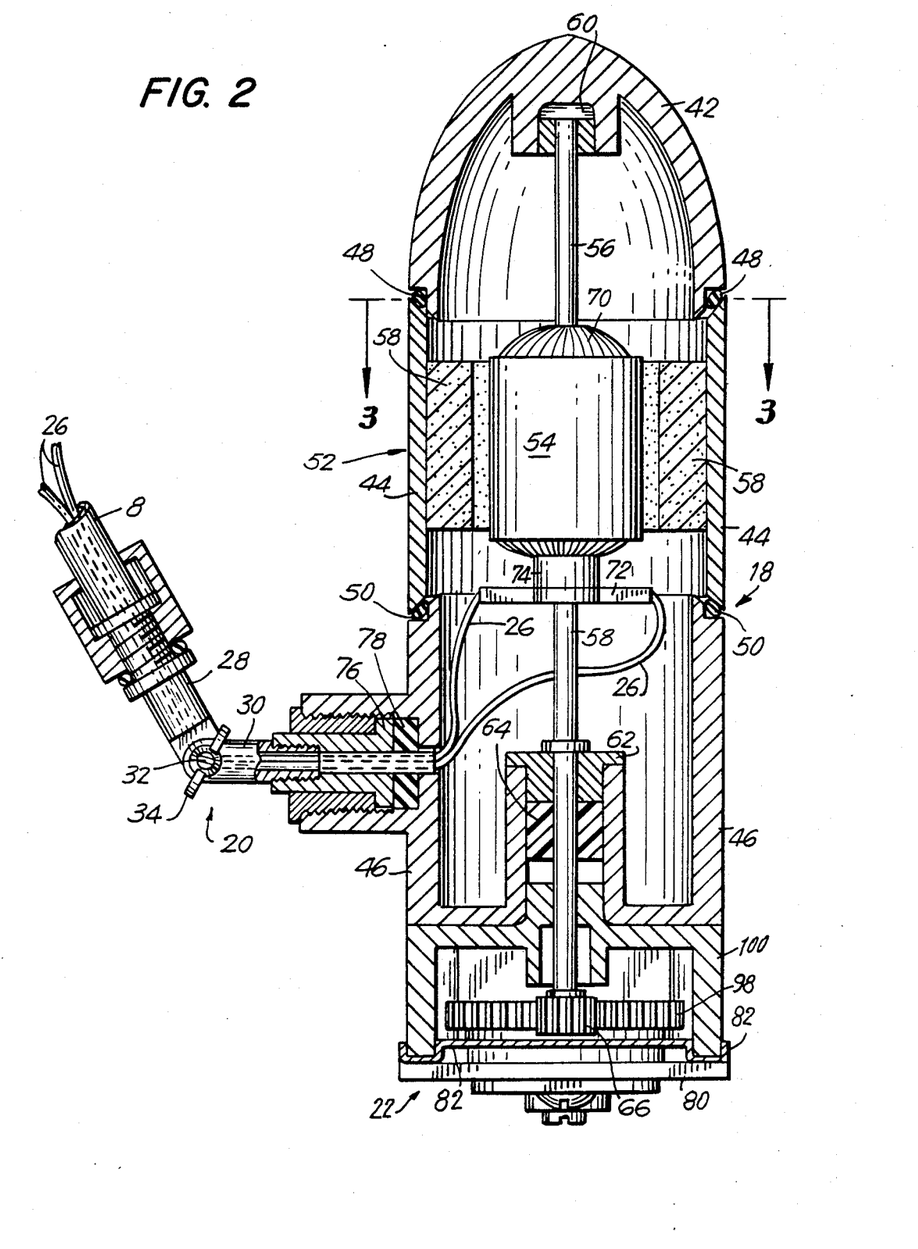
FIG. 2 is a cross-sectional view taken along the line 2—2 of FIG. 1.
Figure 3:
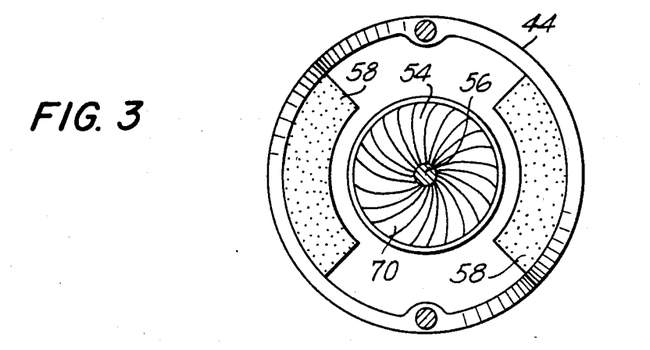
FIG. 3 is a cross-sectional view taken along the line 3—3 of FIG. 2.
Figure 4:
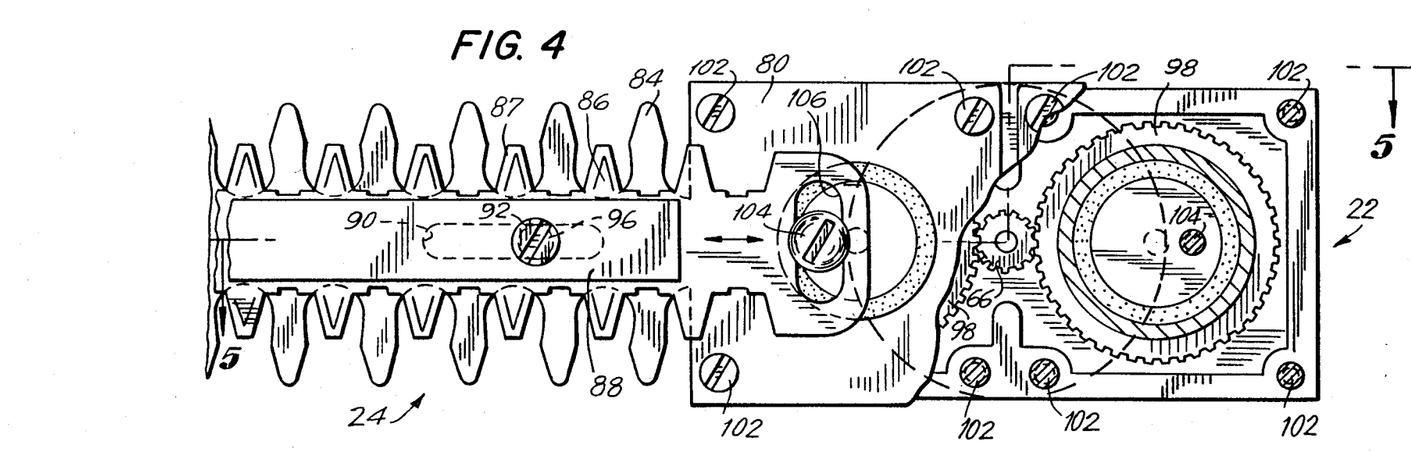
FIG. 4 is a bottom plan view, partially broken away, taken along the line 4—4 of FIG. 1.
Figure 5:
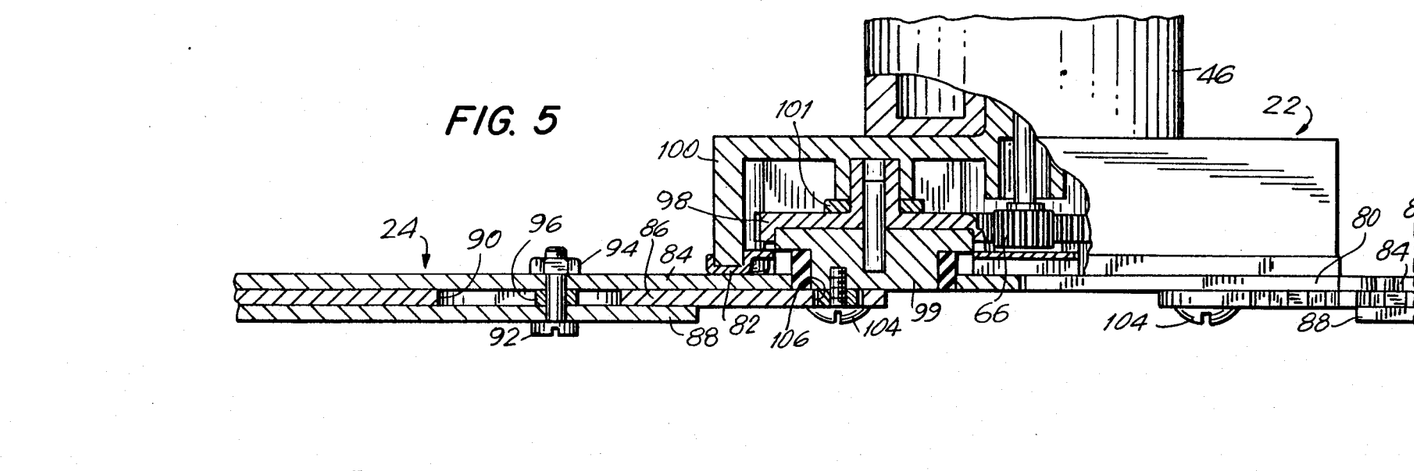
FIG. 5 is a partial cross-sectional and partially elevational view taken along the line 5—5 of FIG. 4.
Figure 6:
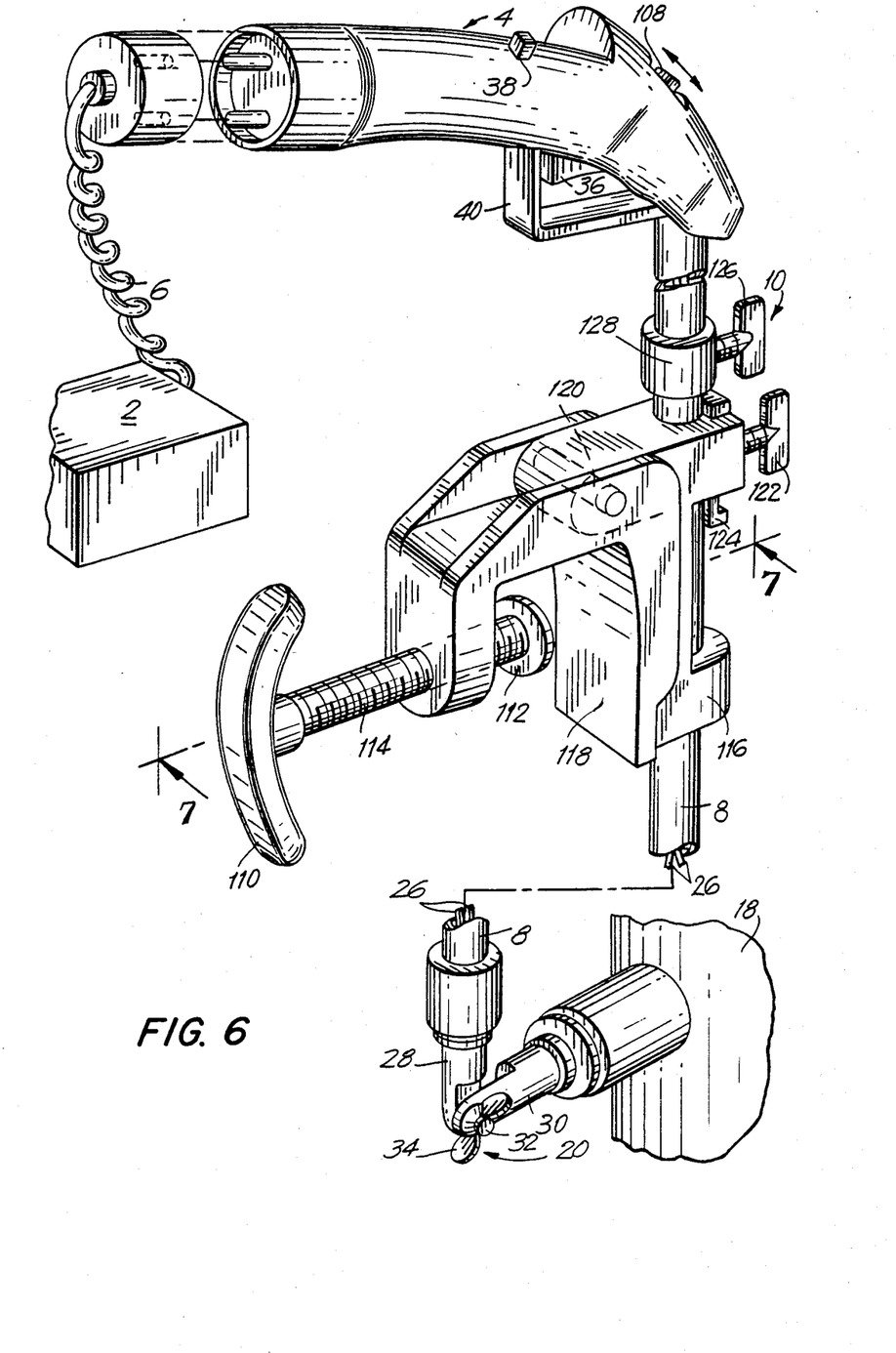
FIG. 6 is a perspective view of the parts of the preferred embodiment of the vegetation cutter, normally disposed above the water line and their connection to the remainder of the device under water.
Figure 7:
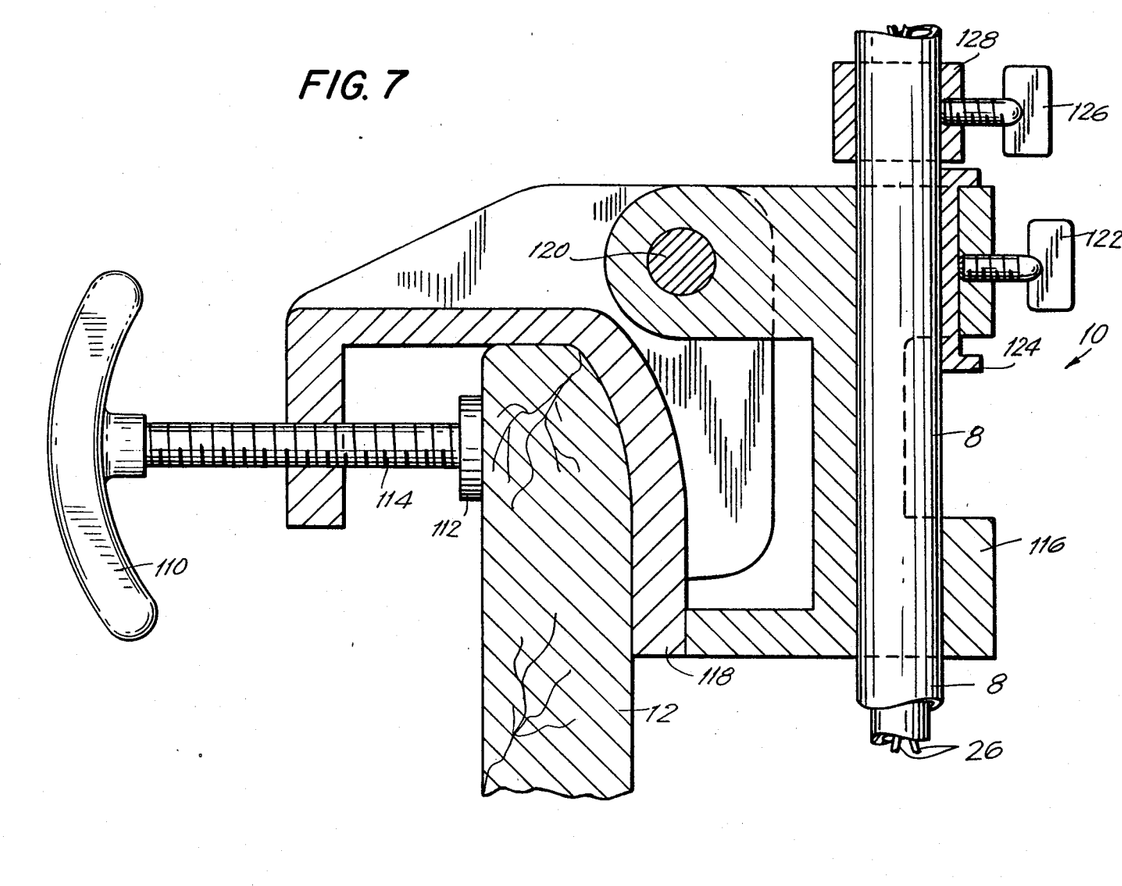
FIG. 7 is a cross-sectional view taken along the line 7—7 of FIG. 6.

As shown in greater detail in FIGS. 2 and 6, electric lead-in wires 26 represent a continuation of the connection to the battery by the coiled cord 6, to transmit electrical power to the motor assembly 18. The adjustable attachment 20 in its simplest form is comprised of an upper elbow joint member 28 and a lower elbow joint member 30 which can be fixed in various relative angular positions by a bolt 32 tightened by a wing nut 34. The lead in wiring 26 passes through the adjustable attachment. In this manner the adjustable attachment 20 permits adjustment of the attitude of the motor assembly 18 and the reciprocating cutting assemblies 24.

While in this preferred embodiment the battery 2 is shown disposed in the boat 14 above the water level 16, a suitable battery could also be employed attached to the device under the water level 16, or disposed elsewhere, such as attached to the belt of the operator or worn by a shoulder strap. Similarly, the electric cord 6 need not necessarily be a coiled cord, and can be disposed in other suitable locations in- or outside the mounting rod 8. For example, it could be disposed within the mounting rod 8 and introduced thereinto closer above the clamp assembly 10 and not necessarily through the handle 4.

As shown better in FIG. 6, an on-off switch 36 is provided in the handle 4, suitably in the form of a trigger switch that can be releasably locked in the on-position by a locking button 38. The trigger switch guard 40 can prevent accidental, unintended actuation of the submarine vegetation cutter 1.

The motor assembly 18 is disposed in a compact housing comprised of an upper housing element 42, a central housing element 44 and a lower housing element 46. These housing elements are mounted together in a water tight relation and are sealed from the intrusion of water at their respective interfaces by an upper O-ring 48 and by a lower O-ring 50. A direct current motor 52 is mounted in the central housing element 44. The motor 52 is comprised of a rotor 54 having an upper shaft 56 rotatably journaled in the upper housing element 42 at 60. The rotor 54 also has a lower shaft 58 which is rotatably journaled within the lower housing element 46 through water tight sealing bushings 62 and 64. The lower rotor shaft 58 extends into the transmission 22 and is fixed in the hub of a transmission pinion gear 66.

The direct current motor 52 further comprises stationary magnets 58 attached to the interior of the central housing element 44. The rotor 54 includes a coil winding 70. The power is transmitted from the electric lead-in wires 26 through a transmitter brush assembly 72 to a collector 74 that is disposed for rotation with the rotor 54. The electrical lead-in wires 26 are lead into the lower housing element 46 through water tight packing members 76 and 78. The transmission 22 is provided with a lid 80 which is attached to a transmission housing 100.

The reciprocating cutting assembly 24 has a toothed stationary blade 84 and a toothed reciprocating blade 86 slideably disposed parallel to the stationary blade. The tops of the teeth of the reciprocating blade 86 are smooth. The edges of the teeth on the bottom are ground to a beveled edge 87. A retaining plate is disposed along the side of the reciprocating blade 86 that is opposite to the side along which the stationary blade 84 is arranged. A groove 90 is provided in the reciprocating blade 86 and an assembly bolt 92 ranges through a hole in the retaining plate, the groove 90 and a hole in the stationary blade 84. The assembly bolt 92 is attached in place by means of an assembly nut 94, thus holding the blade assembly together. A plurality of assembly bolts 92 and assembly nuts 94 are provided throughout the length of each reciprocating cutting assembly to hold the blades 84, 86 and 88 together.

Suitably a low friction coefficient washer 96 such as one made of a PTFE polymer (suitably a polytetrafluoroethylene sold by E.I. DuPont & Co. under the trademark TEFLON) is provided within the groove 90 around the bolt 92. Suitably the washer 96 is very slightly thicker than the thickness of the reciprocating blade 86 to introduce a slight spacing between the blade and the adjacent stationary blade 84 and retaining plate 88. The reciprocation of the blade and the resulting reciprocating movement of the ends of the groove 90 brings some water into the slight clearance between the various parallel elements to provide for easier gliding of the surfaces adjacent to each other.

The pinion gear 66 in the transmission 22 engages larger driving gears 98 of each reciprocating cutting assembly. A driving clutch element 99 is disposed concentrically and in close frictional engagement with the driving gear 99. A spring washer 101 assists in the maintenance of the frictional engagement. The pinion gear 66 and the driving gears 98 are disposed in a transmission housing 100 that is located below the lower housing element 46. The lid 80 is attached to the transmission housing 100 with attaching screws 102. An eccentric drive screw 104 is rotated by the driving clutch element 99. A transverse driving screw groove 106 is provided in the end of each reciprocating blade 86 the longitudinal axis of the groove being perpendicular to the longitudinal axis of the blade. Each drive screw 104 is eccentrically fixed in the driving clutch element 99 for reciprocating the blade through the eccentric rotation of the drive screw 104.

Suitably the interior of the transmission 22 is packed with grease and the lid 80 formed from the end of the stationary blade 84, attached to the transmission housing 100 with screws 102, provides a cover. Advantageously a further outer cover (not shown) is provided for the interior ends of each blade 86 and eccentric drive 104, 106. The outer cover (not shown) is sealingly attached over the eccentric drive cavity by the use of a suitable gasket.

As the stem of an underwater plant to be cut is caught between the teeth of a stationary blade 84 and the reciprocating blade 86, the reciprocating blade pushes the stem of the plant against the stationary blade and nips it off at that point. In the same manner a rope or cable or a thicker rod may get caught in that nip and may foul the cutting blades which are generally set to stop reciprocating at that point when they encounter a resistance. For that case a polarity changing switch 108 is provided suitably in the handle 4 of the vegetation cutter 1. Actuation of the switch 108 can either permanently or momentarily change the polarity of the lead-in wires 26 to the DC motor 52. This will reverse the rotation of the motor as well as the direction of reciprocation of the reciprocating blade 86 and release the cable, tree limb or other object caught between the stationary blade 84 and the reciprocating blade 86.

The clamp assembly 10 serves not only for attaching the device 1 to a transom 12. Its purpose also includes to facilitate hand held operation and also when a cutting assembly 24 hits an underwater obstruction, to permit the cutting assemblies and the entire device to rotate away and thus to prevent the cutting assembly from hitting the obstruction again. Thus, if a large rock or bottle or other obstruction hits the toothed edge of the blades, the blades rotate out of the way into the direction of motion, thus to pass along the obstruction. Then the operator can turn the device back into its operating position that is transverse to the direction of motion by turning the handle 4.

The clamp 10 is provided with a handle 110. This handle provides a double function. It can be used to attach the clamp 10 to the transom 12 of a boat 14 by means of a pressure plate 112 rotatably affixed to that end of a threaded shaft 114 which is opposite to the end to which the handle 110 is attached. When the vegetation cutter 1 is manually operated without the use of a boat or other mounting base, then the pressure plate 112 is advanced fully inward by turning the handle 110, until its extreme inward position. Manual operation can be achieved by the operator holding by one hand to the handle 4 and with the other hand to the handle 110. In the case of manual operation the battery 2 is suitably attached to the belt or a shoulder strap of the operator.

The clamp assembly 10 is comprised of two principal components, a mounting rod support member 116 and a clamping support member 118. The clamping support member is pivotally mounted from the mounting support member at 120. The mounting rod 8 ranges through an opening in the clamping support member 116. A manually adjustable setting screw 122 is provided for exerting pressure on a pressure pad 124. When the setting screw 122 is tightened the pressure pad 124 presses against the mounting rod 8 and prevents it from rotary or up and down movement within the mounting rod support member 116. A setting screw 126 is threaded into a bore on a retaining collar 128 which is disposed around the mounting rod 8. The function of the retaining collar 128 with its setting screw is to limit the depth under the water level 16 to which the underwater parts of the vegetation cutter 1 are immersed.

The setting screw 122 is usually loose during the operation of the vegetation cutter 1. The mounting rod 8 can in that case freely rotate within its support member 116 relative to any support, such as a boat, to which the clamp assembly is attached. Therefore, when one of the cutting assemblies 24 abuts against an underwater obstruction, the vegetation cutter can freely rotate and the cutting assemblies 24 turn more or less parallel to the direction of travel and the device can freely pass by the underwater obstruction.

Figure 8:
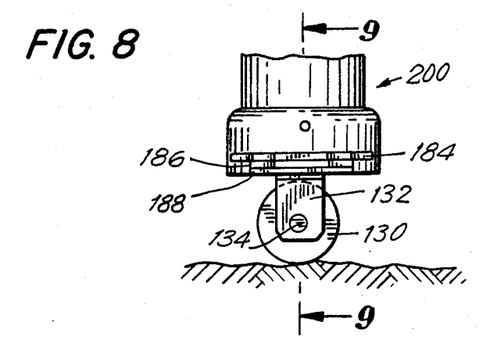
FIG. 8 is a side elevational view of the bottom part of a second preferred embodiment of the invention.

Another embodiment of the submarine vegetation cutter is shown in FIGS. 8-15. As shown in FIG. 8, the cutting device 200 rests on the bottom of a body of water with a bottom roller 130 mounted to the device by a bottom roller bracket 132. The bottom roller 130 is retained in the bottom roller bracket by a roller axle 134. The bottom roller bracket 132 is attached with an assembly bolt 192 and an assembly nut 194 to a reciprocating cutting assembly 224.

Figures 9, 10, 13:
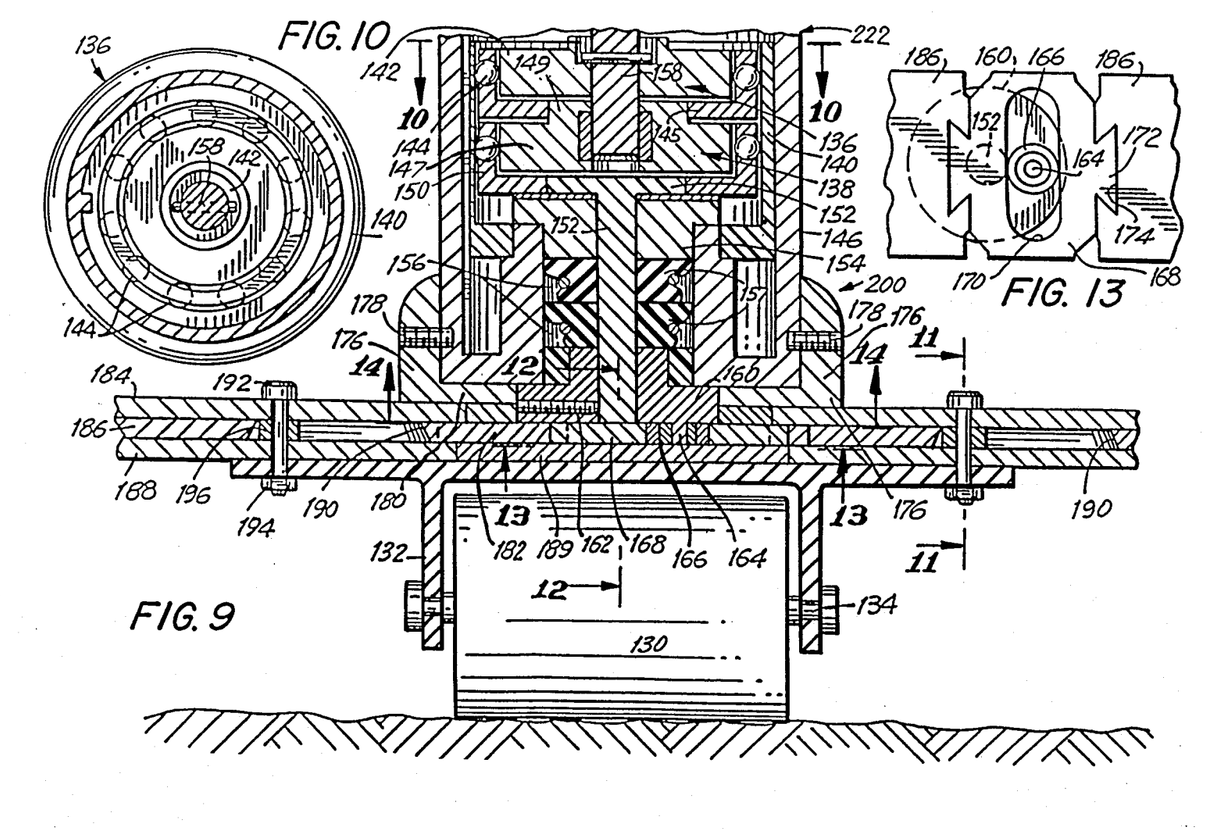
FIG. 9 is a cross-sectional view taken along the line 9—9 of FIG. 8.
FIG. 10 is a cross-sectional view taken along the line of FIG. 9.
FIG. 13 is a elevational view of a central portion of the reciprocating blade assembly taken from 13—13 in FIG. 9.
Figures 11, 12, 14, 15:
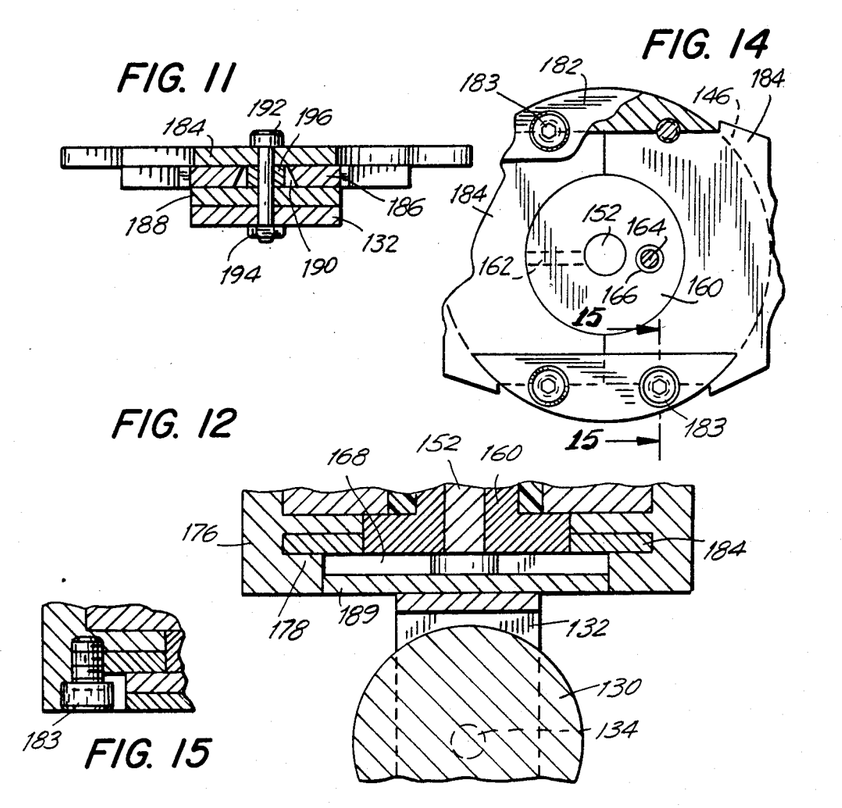
FIG. 11 is a cross-sectional view taken along the line 11—11 of FIG. 9.
FIG. 12 is a cross-sectional view taken along the line 12—12 of FIG. 9.
FIG. 14 is an elevational view of another central part of the reciprocating blade assembly taken from 14—14 in FIG. 9.
FIG. 15 is a cross-sectional view taken along the line 15—15 of FIG. 14.

As best shown in FIG. 9, the reciprocating cutting assembly 224 is comprised of a toothed stationary blade 184 and the toothed reciprocating blade 186. A retaining plate 188 separates the toothed reciprocating blade from the bottom roller bracket 132 Two reciprocating cutting assemblies 224 are disposed in an opposed relationship at the bottom of the cutting device 200, and a central retaining plate 189 is disposed between the two opposed ends of the retaining plates 188 in each reciprocating cutting assembly 224. The central retaining plate 189 is held in place by the bottom roller bracket 132. A groove 190 is provided in the toothed reciprocating blade 186. Suitably the end walls of the groove 190 are beveled, i.e. are disposed at an angle relative to the surface of the reciprocating blade 186.

A low friction coefficient washer, such as made of a PTFE material surrounds the shank of the assembly bolt 192, and is disposed within the groove 190. Also in this embodiment, the thickness of the washer 196 can suitably be just slightly greater than the thickness of the toothed reciprocating blade 186. The lubricating effect of a film of water between the reciprocating blade 186 and the adjoining stationary blade 184 and retaining blade 18 is enhanced by the water pumping action of the reciprocations of the beveled ends of the groove 190.

The driving force of an electric motor (not shown) is conveyed by a drive shaft 158 to a planetary transmission 222. The planetary transmission is comprised primarily of two ball bearing stages, a first stage 136 and a second stage 138. The first and second ball bearing stages are retained at their respective outer peripheral rings 140 in a housing. The drive shaft 158 imparts its rotary energy to an interior ring 142 of the first stage ball bearing 136. Balls 144 of the first stage ball bearing 136 are disposed within the ball holding basket which maintains the balls 144 evenly distributed around its circumference. The ball holding basket 145 goes over the lower end of the first stage ball bearing 136 and partially covers that lower end. The lower or second stage ball bearing 138 is provided with an interior ring 147 which has an upwardly protruding part in positive driving engagement with a downwardly protruding part of the ball holding basket 145 of the first stage ball bearing 136. This is suitably accomplished by providing a concentric square opening within the ball holding basket 145 and a protruding, matingly square boss 149 concentric, and integral with the interior ring 147.

Thus the R.P.M. the drive shaft 158 is reduced in the first stage 136, and this reduced R.P.M. is output with a greater torque through the basket 145 driving the interior ring 147. The R.P.M. transmitted to the interior ring 147 is further stepped down in the second stage ball bearing 138. This slowed down rotation, with further increased torque is transmitted by ball holding basket 150 of the second stage ball bearing 138 to a cutting blade drive shaft 152. The engagement between the ball holding basket 150 can be suitably constructed similarly to the engagement between the ball holding basket 145 and the interior ring 147 through the square boss 149.

The cutting blade drive shaft 152 is journaled in a brass bushing 154 and is then sealed against water penetration by seals 156 secured by spring retainers 157. A driving gear 160 is attached by a setting screw 162 for rotation with the cutting blade drive shaft 152.

A driving eccenter shaft 164 is provided integral with the driving gear 160. The eccenter shaft 164 is surrounded with a rotary bushing, such as a ball bearing 166. A reciprocating driving plate 168 (FIGS. 9, 13) is disposed between the interior, opposed ends of the reciprocating blades 186, and is attached for reciprocating each of these, by means of a key shaped boss 172 engaging a mating notch 174 in the end of each reciprocating blade 186.

A cowling 176 is attached with setting screws 178 to the bottom of the housing 146. A reentrant portion 180 of the cowling 176 provides a seal between the bottom edge of the housing 146 and the stationary blade 184.

The opposing, interior ends of the stationary cutting blades 184 are attached with a locking plate 182 by lacking screws 183 to the housing. The planetary transmission 222 can contain as many stages as are necessary to convert the speed and the torque of the driving force from the motor to the required speed and torque for reciprocating the cutting blade. The planetary transmission of the present invention also incorporates its own clutch to separate the rotation provided by the driving motor to the transmission, from the reciprocation of the blade. This is achieved in accordance with the present invention by providing a slippage between the inner ring and the ball basket of the ball bearing. The predetermined force at which a slippage will occur can be adjusted by providing a larger or lesser number of balls in the bearings of the transmission. The more balls, the higher the force at which the slippage occurs. Conversely, the fewer balls, the more readily slippage occurs. In providing the requisite number of balls they should be distributed about the inner ring in a peripherally uniformly spaced relationship.

The preferred embodiments of the present invention provide a simple construction for the cutting device for the present invention which can be most easily maintained, because the parts that are most likely to wear out sooner, can be readily separated and replaced without the replacement with an undue number of other parts.

The preferred embodiments of the present invention are described only for purposes of illustration. The breadth of the present invention is determined by the scope of the following claims.

I claim:

1. A light weight, portable aquatic vegetation harvester which comprises a direct current electrical motor for generating a driving force, two reciprocating type cutting blade assemblies disposed in a substantially opposed relationship relative to each other, means for transmitting the driving force of said motor to said blade assemblies, and means for reversing the polarity of the direct current to said motor, means for preventing the intrusion of water to preselected parts of the aquatic vegetation harvester, and a switch which upon the occurrence of a preselected operating condition prevents electrical power from being conducted to said direct current electrical motor.

2. The aquatic vegetation harvester of claim 1, wherein said switch comprises a level switch for preventing electric power from being conducted to said motor when the position of said vegetation cutter exceeds a preselected angle deviating from the vertical.

3. A light weight, portable aquatic vegetation harvester which comprises means for preventing the intrusion of water to preselected parts of the aquatic vegetation harvester, an electrical motor for providing a driving force through a shaft, two elongated reciprocating type cutting blade assemblies disposed in a substantially end-to-end opposed relationship relative to each other, means for transmitting the driving force of said motor to each of said cutting blade assemblies, said means for transmitting being disposed in a plane intermediate said blade assemblies, each cutting blade assembly comprising a toothed, stationary cutting blade, and a toothed reciprocating cutting blade for reciprocating cutting movement disposed in use parallel to and having its cutting teeth substantially exposed below said toothed stationary cutting blade.

4. The light weight, portable aquatic vegetation harvester of claim 3, wherein each of said cutting blade assemblies further comprises a retaining plate that is substantially narrower than the width of said reciprocating blade, said retaining plate being disposed parallel to and below said toothed reciprocating cutting blade on the side thereof that is opposite to the side that is adjacent to said toothed stationary cutting blade, said retaining plate, said toothed reciprocating blade, and said toothed stationary blade being connected together to form a cutting blade assembly.

5. The submarine vegetation cutter of claim 3, further comprising means for disengaging the transmission of driving force to said cutting blade assemblies when a greater than predetermined force resists reciprocating the reciprocating cutting blade.

6. The submarine vegetation cutter of claim 3, wherein said toothed reciprocating blade has a longitudinal axis, and at least one elongated groove is provided in said reciprocating blade along said longitudinal axis, said groove having tapering end walls in the thickness of said blade, and an assembly screw is disposed within said groove and is surrounded in said groove by a spacer made from a synthetic material, said spacer being higher than the thickness of said reciprocating blade, whereby water is admitted between said reciprocating blade and said stationary blade.

7. The submarine vegetation cutter of claim 3, wherein said means for transmitting comprises the shaft of said electrical motor being attached to a pinion gear, said pinion gear being adapted to rotate driving gears each being associated with a cutting blade assembly, each of said driving gears being connected through a sliding clutch to a wheel having an eccentric driving screw adapted to drive said reciprocating blade.

8. The submarine vegetation cutter of claim 3, wherein the driving motor, said means for transmitting, and said reciprocating type cutting blade assemblies are all disposed at one end of an elongated arm, said vegetation cutter further comprising a handle for the introduction of electrical current for the motor therethrough and a switch for connecting said motor to said current, said handle and said switch being disposed at the other end of said elongated arm, and mounting means disposed intermediate the two ends of said elongated arm for attaching the cutter to a boat and for permitting a swinging motion of said submarine vegetation cutter along the longitudinal axis of said boat, as well as permitting rotation of said vegetation cutter when a cutting blade assembly hits an under water obstruction.

9. The submarine vegetation cutter of claim 3, further comprising a bottom roller attached to the bottom of the cutter.

10. The submarine vegetation cutter of claim 3, further comprising means for reversing the polarity of the direct current to said motor.

11. A light weight, portable aquatic vegetation harvester which comprises means for preventing the intrusion of water to preselected parts of the aquatic vegetation harvester, an electrical motor for generating a driving force, two reciprocating type cutting blade assemblies disposed in a substantially opposed relationship relative to each other, means for transmitting the driving force of said motor to said cutting blade assemblies, each cutting blade assembly comprising a toothed stationary cutting blade, and a toothed reciprocating cutting blade for reciprocating cutting motion disposed in use parallel to and having its cutting teeth substantially exposed below said toothed stationary cutting blade, said means for transmitting comprising at least one ball bearing, having an outer ring, an inner ring, and a ball carrying basket disposed substantially concentrically within said outer ring, said inner ring being driven by the electrical motor, and the resulting rotation of said ball carrying basket being transmitted to said cutting blade assemblies.

12. The submarine vegetation cutter of claim 11, wherein said means for transmitting comprises two ball bearings connected in series, with the ball carrying basket of the first ball bearing being adapted to transmit its driving force to the interior ring of the second ball bearing, and the rotary output of the ball carrying basket of the second ball bearing is transmitted to the reciprocating type cutting blade assemblies.

13. The submarine vegetation cutter of claim 12, wherein the force at which the balls within each ball bearing begin to slip in the case of a rotation blockage, is adjusted by varying the number of balls in each bearing.

14. The submarine vegetation cutter of claim 13, wherein in a shaft is provided for transmitting the rotary output of the ball carrying basket of said second ball bearing to said cutting blade assemblies, said shaft being disposed in a housing an surrounded by at least one shaft seal for preventing the seepage of water into said housing.

15. The submarine vegetation cutter or claim 11, wherein said toothed reciprocating blade has a longitudinal axis, and at least one elongated groove is provided in said reciprocating blade along said longitudinal axis, said groove having tapering end walls in the thickness of said blade, and an assembly screw is disposed within said groove and is surrounded in said groove by a spacer made from a synthetic material, said spacer being higher than the thickness of said reciprocating blade, whereby water is admitted in the gap between said reciprocating blade and said stationary blade.

16. The submarine vegetation cutter of claim 11, further comprising a level switch for preventing electric power from being conducted to said motor when the position of said vegetation cutter exceeds a preselected angle deviating from the vertical.

17. The submarine vegetation cutter of claim 11, further comprising a gear driven by the rotary output of said ball carrying basket of said ball bearing, a driving pin mounted eccentrically from said gear, and a slotted connecting plate having a transverse slot therein, said slotted plate being attached to the opposed, interior ends of the reciprocating cutting blades of the cutting blade assemblies, said pin ranging through the slot in said slotted plate for reciprocatingly driving said reciprocating blades of the two cutting blade assemblies.

* * * * *